(12) United States Patent
Subramanian et al.

(10) Patent No.: US 11,709,670 B2
(45) Date of Patent: Jul. 25, 2023

(54) IDENTIFYING AND CONFIGURING COMPATIBLE VERSIONS OF RUNTIME COMPONENTS BY SHARED LIBRARIES

(71) Applicant: Advanced Micro Devices, Inc., Santa Clara, CA (US)

(72) Inventors: Srinivasan Subramanian, Palo Alto, CA (US); Pruthvi K. Madugundu, Santa Clara, CA (US); Freddy Paul, Mountain House, CA (US); Jagadish Krishnamoorthy, Santa Clara, CA (US); Diwakar Das, Dublin, CA (US); Praveen K. Jain, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/848,681

(22) Filed: Apr. 14, 2020

(65) Prior Publication Data
US 2021/0318862 A1    Oct. 14, 2021

(51) Int. Cl.
| | | |
|---|---|---|
| *G06F 9/50* | (2006.01) |
| *G06F 9/54* | (2006.01) |
| *G06F 9/445* | (2018.01) |
| *G06F 9/455* | (2018.01) |
| *G06F 8/71* | (2018.01) |
| *G06F 16/14* | (2019.01) |
| *G06F 16/176* | (2019.01) |

(52) U.S. Cl.
CPC ............... *G06F 8/71* (2013.01); *G06F 9/445* (2013.01); *G06F 16/148* (2019.01); *G06F 16/176* (2019.01)

(58) Field of Classification Search
CPC ........ G06F 8/71; G06F 9/4488; G06F 9/4494; G06F 9/45516; G06F 11/36; G06F 21/577; G06F 21/53; G06F 21/54; G06F 9/44521; G06F 9/455; G06F 2221/033; G06F 16/148; G06F 16/176; G06F 9/445; G06F 9/44536; G06F 9/45533; G06F 9/5077; G06F 8/76; G06F 21/125; G06F 11/0712; G06F 8/52; H04L 67/02
See application file for complete search history.

(56) References Cited

U.S. PATENT DOCUMENTS

| | | | |
|---|---|---|---|
| 10,007,497 B2* | 6/2018 | Eltsin | .................. G06F 8/76 |
| 10,564,959 B2* | 2/2020 | Kennedy | ................ G06F 8/71 |

(Continued)

*Primary Examiner* — Thuy Dao
(74) *Attorney, Agent, or Firm* — Park, Vaughan, Fleming & Dowler LLP

(57) ABSTRACT

An electronic device includes a processor and a storage device having a file system with a plurality of directories. The processor executes an application that has a dependency on a shared library, the shared library having a dependency on a runtime component. When executing the application, the processor loads the shared library, the loading including executing a constructor for the shared library. Executing the constructor causes the processor to identify a selected directory where a compatible version of the runtime component is to be found based on a location of the shared library in the file system, the location of the shared library being determined from an application context from the application. When subsequently loading the runtime component for execution, the processor locates the runtime component in the selected directory.

22 Claims, 4 Drawing Sheets

(56) References Cited

U.S. PATENT DOCUMENTS

| | | | |
|---|---|---|---|
| 2003/0159135 A1* | 8/2003 | Hiller | G06F 9/44536 717/122 |
| 2005/0166196 A1* | 7/2005 | Grier | G06F 8/54 717/162 |
| 2005/0262493 A1* | 11/2005 | Schmidt | G06F 9/4488 717/164 |
| 2008/0256530 A1* | 10/2008 | Armstrong | G06F 9/45533 717/174 |
| 2012/0011513 A1* | 1/2012 | McConaughy | G06F 9/545 718/100 |
| 2019/0278588 A1* | 9/2019 | Miyake | B60R 16/023 |

* cited by examiner

IDENTIFYING AND CONFIGURING COMPATIBLE VERSIONS OF RUNTIME COMPONENTS BY SHARED LIBRARIES

BACKGROUND

Related Art

Many electronic devices execute program code for applications such as productivity applications, data center applications, scientific computing applications, etc. Applications often depend on shared libraries, which are files that include program code with functions, variables, etc. that can be "shared," and thus used, by a number of different applications at runtime. For example, applications may use a shared math library that includes program code and variables for mathematical functions, a shared scientific computing library that includes program code and variables for scientific computing functions, etc. In some cases, applications are dynamically linked to shared libraries at runtime. For dynamic linking, program code of an application initially includes a reference to a shared library that is to be updated at runtime to bind the shared library to the application. When the application is executed at runtime, a runtime linker program is called to initialize the application. Among the operations that the runtime linker performs for initializing the application is loading the shared library from a storage device (e.g., non-volatile storage such as a disk) to a memory and binding the application to the loaded shared library. For this operation, the runtime linker determines a location in a file system of the storage device where the shared library is located, loads/copies the shared library from the location of the storage device to the memory, and updates the application's reference to the shared library to indicate the location of the shared library in the memory. After the runtime linker has finished binding the application to the shared library, the application is set up for invoking shared library functions, reading variable values and data from the shared library, etc. during subsequent execution of the application.

Along with binding applications to shared libraries, the runtime linker binds shared libraries to their respective dependencies. For example, some shared libraries have dependencies on, and are dynamically linked to, runtime components (e.g., other shared libraries, etc.). For binding a shared library to a runtime component, the runtime linker determines a location in a file system of the storage device where the runtime component is located, loads/copies the runtime component from the location of the storage device to the memory, and updates the application's reference to the runtime component to indicate the location of the runtime component in the memory. After the runtime linker has finished binding the shared library to the runtime component, the shared library is set up for invoking runtime component functions, reading variable values and data from the runtime component, etc. during subsequent execution of the program code in the shared library.

When determining locations in the file system where shared libraries and runtime components are located, the runtime linker searches in two types of locations. The first type of location is directories in the file system that are "hard-coded" or specifically listed in program code for the runtime linker. For example, some runtime linkers search by default in/lib and user/lib directories in a Unix-based file system. The second type of location is directories in the file system for which identifiers are manually provided to the runtime linker by a user. For example, users can add identifiers of directories to configuration files for the runtime linker or to environment variables that are read by the runtime linker. In other words, when shared libraries or runtime components are not located in directories that are automatically searched by the runtime linker, a user is responsible for informing the runtime linker of the directories to be searched. Requiring that a user inform the runtime linker of the location of shared libraries and runtime components is inefficient and error prone. This is particularly true in cases where there are multiple versions of standard libraries and/or runtime components present in the file system.

BRIEF DESCRIPTION OF THE FIGURES

Throughout the figures and the description, like reference numerals refer to the same figure elements.

DETAILED DESCRIPTION

Figure 1:
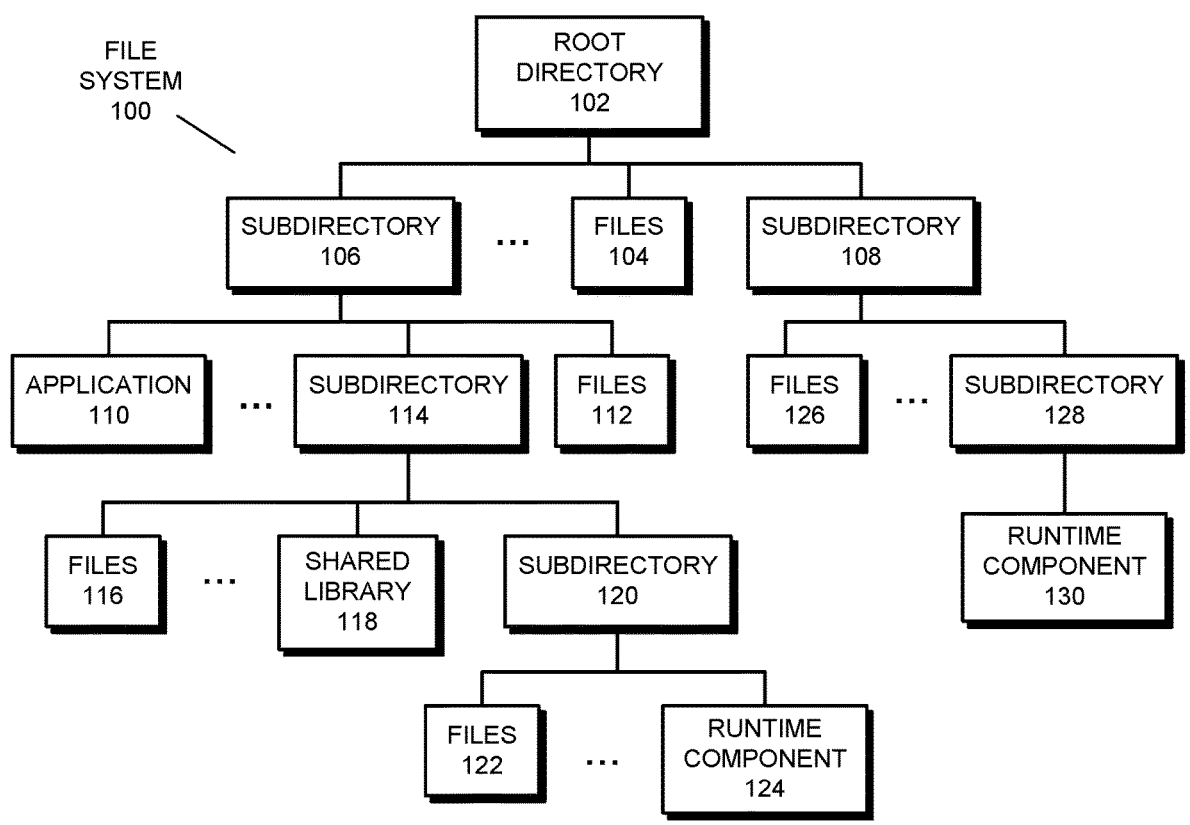
FIG. 1 presents a block diagram illustrating a file system in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of these terms. Note that these terms may have significant additional aspects that are not recited herein for clarity and brevity and thus the description is not intended to limit these terms.

Functional block: functional block refers to a group, collection, and/or set of one or more interrelated circuit elements such as integrated circuit elements/circuitry, discrete circuit elements/circuitry, etc. The circuit elements are "interrelated" in that circuit elements share at least one property. For example, the interrelated circuit elements may be included in, fabricated on, or otherwise coupled to a particular integrated circuit chip, substrate, circuit board, or portion thereof, may be involved in the performance of given functions (computational or processing functions, memory functions, etc.), may be controlled by a common control element and/or a common clock, etc. A functional block can include circuitry having any number of circuit elements, from a single circuit element (e.g., a single integrated circuit logic gate or discrete circuit element) to millions or billions of circuit elements (e.g., an integrated circuit memory).

Version: software entities (e.g., applications, shared libraries, runtime components, operating systems, scripts, etc.) may exist as or have two or more separate versions. Each separate version of a software entity is a copy of the software entity that was generated (e.g., compiled from, linked, etc.) using a different arrangement of program code, input files, variable or data values, languages, configurations, etc. For example, a first version of a software entity might be an original version released by a developer as a new software entity. Continuing the example, second and subsequent versions of the software entity might be updates to prior version(s) of the software entity with bug fixes, feature changes, functional improvements, updated data, different configurations, etc.—or might be entirely new versions of the software entity. In some cases, software entities will be compatible with only certain versions of other software entities—and thus will be operable with only the certain versions of the other software entities. For example, version 3 of an application from among a sequence of versions that includes versions 1-4 of the application may be compatible with versions 1-3 of a shared library, but incompatible with version 4 of the shared library.

File System and Paths

Figure 2:
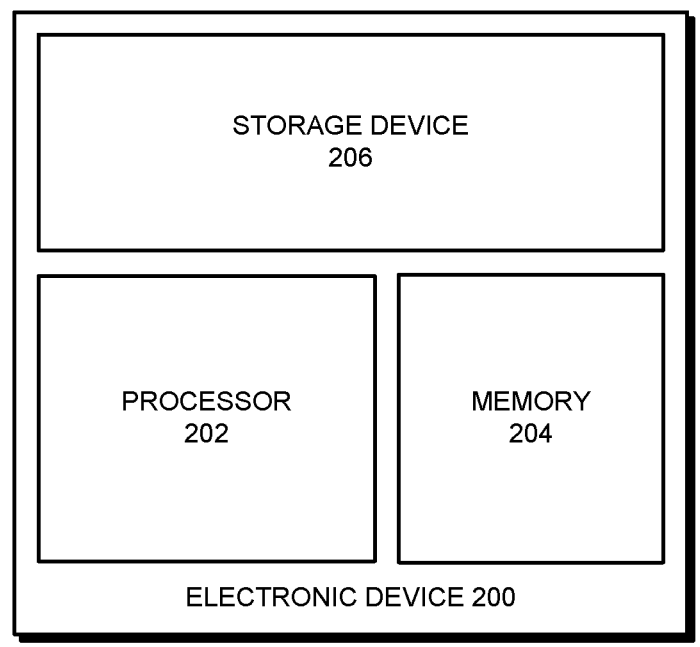
FIG. 2 presents a block diagram illustrating an electronic device in accordance with some embodiments.

In the described embodiments, a number of files are stored in memory elements (e.g., magnetic or optical memory elements) or memory circuitry (e.g., integrated circuit memory circuitry) of a storage device (e.g., storage device 206 in FIG. 2). For example, application files, shared library files, runtime component files, data files, configuration files, and/or other types of files can be stored on the storage device. The files are organized on the storage device using a file system. The file system includes an arrangement of directories, each directory being an abstract container in which files and subdirectories (and possibly other file system entities such as shortcuts, pointers, etc.) are stored.

FIG. 1 presents a block diagram illustrating a file system in accordance with some embodiments. As can be seen in FIG. 1, a top or highest level directory in a hierarchy of directories in file system 100 is root directory 102. A number of files 104 are stored in root directory 102, each of files 104 being a separately accessible file such as a text or document file, a media file, etc. Subdirectories 106 and 108—which are lower in the hierarchy than root directory 102—are also stored in root directory 102. Proceeding downward in the hierarchy from subdirectory 106, application 110 (e.g., program code for an application such as a productivity application, etc.) and files 112 are stored in subdirectory 106. Subdirectory 114 is also stored in subdirectory 106. Files 116 and shared library 118 (e.g., program code for a library of functions, variables, etc. that can be accessed, and thus shared among, a number of applications) are stored in subdirectory 114. Subdirectory 120 is stored in subdirectory 114. Files 122 and runtime component 124 (e.g., program code for a version of a runtime component that may be accessed by shared library 118—and possibly other entities) are stored in subdirectory 120. Proceeding downward in the hierarchy from subdirectory 108, files 126 and subdirectory 128 are stored in subdirectory 108. Runtime component 130 (e.g., program code for a version of a runtime component that may be accessed by shared library 118—and possibly other entities) is stored in subdirectory 128. In some embodiments, runtime components 124 and 130 are different versions of the same runtime component that is used by shared library 118—and a particular one of runtime components 124 and 130 can be selected for use by shared library 118 as described herein.

The directories/subdirectories (e.g., subdirectory 106, etc.), files (e.g., files 104, etc.), shared library 118, and runtime components (runtime components 124 and 130) are accessed along "paths" in file system 100. Generally, paths are listings or sequences of directories that are used to identify the particular location, and thus directory, in which directories or files are stored. For example, using a Unix-type nomenclature where root directory 102 is indicated by the/character, and assuming that subdirectory 106 is named "xyz," application 110, files 112, and subdirectory 114 are accessed (e.g., read, deleted, written, etc.) along the path/xyz. In some embodiments, paths in file systems can be absolute paths, in which a full listing of directories from a first directory to a directory or file is specified; relative paths, in which a listing of directories from a current directory (i.e., a directory within the file system in which a processor is presently operating) to a directory or file is specified; and canonical paths, in which path for each directory or file in a file system is expressed as a single unique path to that directory or file. In some embodiments, all canonical paths are absolute paths, but not all absolute paths are canonical.

Although a particular arrangement of directories and files is used to illustrate file system 100 in FIG. 1, in some embodiments, different arrangements and/or numbers of directories and/or files are present in file system 100. Generally, the described embodiments can use any arrangement of directories and/or files in a file system in which shared libraries and/or runtime components can be stored and accessed as described herein.

Overview

In the described embodiments, an electronic device includes a processor (e.g., a central processing unit, etc.), a non-volatile storage device (e.g., a disk, a non-volatile semiconductor memory, etc.), and a volatile memory (e.g., a "main" memory implemented in dynamic random access memory). The storage device is organized in accordance with a file system (e.g., file system 100) that includes a number of directories in which are stored an application (e.g., a productivity application, etc.), a shared library, and one or more versions of a runtime component. The application has a dependency on the shared library and therefore includes program code such as function calls, variables, etc. that are directed to corresponding functions, variables, etc. in the shared library. The shared library in turn has a dependency on the runtime component and therefore includes program code such as function calls, variables, etc. that are directed to corresponding functions, variables, etc. in the runtime component. In the described embodiments, while being loaded as the application is loaded, the shared library (or, rather, the processor executing program code from the shared library) performs operations for searching for a compatible version of the runtime component in the file system and configuring the shared library to use the compatible version of the runtime component for subsequent execution. The shared library, that is, configures itself to use the compatible version of the runtime component.

In the described embodiments, the shared library performs operations for configuring itself to use the compatible version of the runtime component as the shared library is loaded. Generally, when an application is executed, the application is loaded from the storage device to a memory in the electronic device. As the application is loaded, the application is initialized, which includes resolving dynamic dependencies of the application. In other words, the application includes program code that calls functions, relies on variables or data in, and otherwise interacts with shared libraries (and possibly other software entities) that is not completely set up prior to runtime. The application's dynamic dependencies are resolved as the application commences execution by a software entity called a runtime linker (or, rather, by the processor executing program code for the runtime linker). Along with resolving the applications' dynamic dependencies, the runtime linker resolves dynamic dependencies of the applications' dependencies. In some embodiments, when initializing an application, the runtime linker first analyzes application information to determine the dependencies of the application, such as dependencies on shared libraries (or other software entities). The runtime linker then searches for and loads the shared libraries upon which the application depends from a storage device to a memory and updates application information about the shared libraries in the memory—thereby "binding" the shared libraries to the application. The runtime linker next analyzes shared library information to determine if the shared libraries themselves have dependencies and, if so, searches for and loads the dependencies of the shared libraries. The runtime linker continues in this way through a hierarchy of dependencies for the application until all dependencies have been located and loaded.

As part of the above-described loading process, the runtime linker calls initialization functions of shared libraries. The initialization function program code, called a "constructor" herein, is included in or associated with the shared library and includes program code for setting up/initializing, configuring, etc. one or more aspects of the shared library. In some embodiments, the operations performed by the constructor include the above-described searching for compatible versions of runtime components and configuring the shared library to use compatible versions of runtime components. In other words, shared libraries, via their constructors, configure themselves to use the compatible version of runtime components. In some embodiments, as the shared library is loaded by the runtime linker, the runtime linker executes (or, rather, causes the processor to execute) the constructor for the shared library. The constructor determines a path (e.g., a canonical path) of the shared library in the file system from an application context of the application. For example, the constructor may determine the path of the shared library at least in part based on information from an information section in program code for the application. The constructor then identifies candidate directories in the file system where a compatible version of the runtime component may be located based at least in part on the path. The constructor next finds a selected directory where the compatible version of the runtime component is located among the candidate directories. The constructor then configures a record in an internal state of the shared library, e.g., an information section in the program code of the shared library, to identify the selected directory as being where the compatible version of the runtime component is located. After the constructor is finished, therefore, the internal record of the shared library includes current and correct information about the location of the runtime component—which can then be loaded by the runtime linker as described herein.

In some embodiments, when identifying candidate directories in the file system where a compatible version of the runtime component may be located based on the path of the shared library, the constructor first derives or generates one or more given paths (e.g., canonical paths) where the candidate directories are located. For example, the constructor may retrieve a listing or identification of one or more relative paths from a record in the shared library and derive the one or more given paths based on combinations of the path of the shared library and the one or more relative paths.

In some embodiments, for finding the selected directory where the compatible version of the runtime component is located, the constructor searches each of the candidate directories to find a candidate directory in which a version of the runtime component that best meets one or more version criteria is located—and then selects that candidate directory as the selected directory. In some embodiments, the searching includes comparing versions of the runtime component found in each candidate directory to the one or more version criteria such as a filename criterion, a file information criterion, etc.

In some embodiments, when the above-described search of the candidate directories does not yield a compatible version of the runtime component, the constructor performs a secondary search. In some embodiments, the secondary search involves searching each of one or more specified other directories to determine other directories that include one or more versions of the runtime component. For example, the constructor may simply search all available directories in the file system or may search directories in a specified portion or subsection of the file system. As with the search in the candidate directories, the secondary searching includes comparing versions of the runtime component found in each other directory to the version criterion and selecting, as the selected directory, an other directory in which a version of the runtime component best meets the version criterion. In some embodiments, when the secondary search fails to find a compatible version of the runtime component, the processor halts execution of the application and/or performs error handling operations.

By using constructors in shared libraries to search for compatible versions of runtime components and configure the shared libraries to use the compatible versions of the runtime components, the described embodiments avoid the existing requirement for storing runtime components in directories that are hard-coded into runtime linker program code or for users to manually inform runtime linkers of locations of runtime components. In addition, by performing the secondary search, the described embodiments can avoid the need for halting the application when a compatible version of the runtime component is not initially found. This can simplify the use of the electronic device for users, thereby increasing user satisfaction with the electronic device.

Electronic Device

FIG. 2 presents a block diagram illustrating electronic device 200 in accordance with some embodiments. Electronic device 200 includes processor 202, memory 204, and storage device 206. Generally, processor 202, memory 204, and storage device 206 are implemented in hardware, i.e., using various circuitry, circuit elements, and devices. For example, processor 202 and memory 204 can be entirely implemented on one or more semiconductor chips, including on one or more separate semiconductor chips, can be implemented using semiconductor chips in combination with discrete circuit elements, can be implemented using discrete circuit elements alone, etc. As another example, storage device 206 can be implemented on one or more semiconductor chips (for a large capacity non-volatile semiconductor memory storage device), using one or more drives/motors, magnetic or optical disks, and access circuitry (for a disk storage device), etc. Processor 202, memory 204, and storage device 206 perform operations associated with shared libraries configuring themselves to use compatible versions of runtime components as described herein.

Processor 202 is a functional block that performs program code execution, memory access, and other operations in electronic device 200. Processor 202 includes one or more functional blocks such as central processing unit (CPU) cores, graphics processing unit (GPU) cores, embedded processors, and/or application specific integrated circuits (ASICs) that perform general purpose program code execution, control, memory access, and/or other operations.

Memory 204 is a functional block that performs operations of a memory (e.g., a main memory) in electronic device 200. Memory 204 includes memory circuits for storing instructions, information, and data for access by functional blocks in electronic device 200, as well as control circuits for handling accesses of data in the memory circuits. The memory circuits in memory 204 include volatile memory circuits such as double data rate synchronous dynamic random access memory (DDR SDRAM), static random access memory (SRAM), and/or other types of memory circuits.

Storage device 206 is a functional block that performs operations of a mass-storage device in electronic device 200. For example, storage device 206 can be or include an optical or magnetic disk storage device, a larger capacity non-volatile semiconductor memory storage device (e.g., flash memory, phase change memory, etc.), etc. In some embodiments, applications, shared libraries, and runtime components are stored in one or more directories of a file system on storage device 206 for long term/persistent storage, but are loaded to memory 204 upon execution of the application at runtime. When loading applications, shared libraries, and runtime components acquired from storage device 206 to memory 204, processor 202 performs various operations to initialize the applications, shared libraries, and/or runtime components, as described herein.

Electronic device 200 is shown as including particular numbers and arrangements of elements (i.e., processor 202, memory 204, and storage device 206), but is simplified for illustrative purposes. In some embodiments, a different number or arrangement of elements is present in electronic device 200. For example, electronic device 200 can include power subsystems, networking subsystems, human interface systems, etc. Generally, electronic device 200 includes sufficient elements to perform the operations described herein.

Electronic device 200 can be, or can be included in, any electronic device that performs operations that involving applications, shared libraries, and runtime components described herein. For example, electronic device 200 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Software Entities

Figure 3:
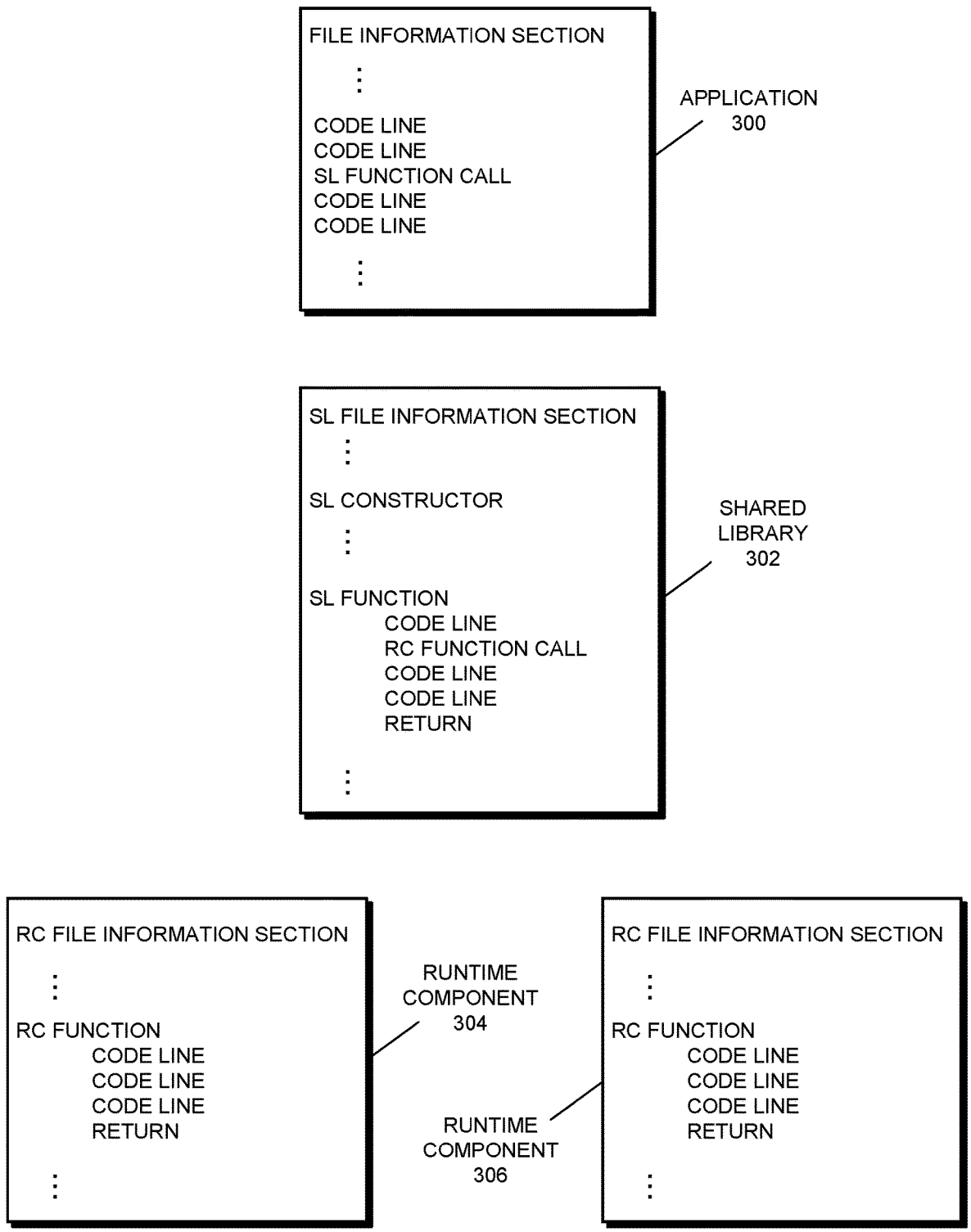
FIG. 3 presents a block diagram illustrating an application, a shared library, and versions of a runtime component in accordance with some embodiments.

In the described embodiments, software entities including an application, a shared library, and a runtime component perform respective operations. FIG. 3 presents a block diagram illustrating application 300, shared library 302, and runtime components 304-306 in accordance with some embodiments. Note that application 300, shared library 302, and runtime components 304-306 shown in FIG. 3 are an example of software entities in some embodiments. In other embodiments, different numbers and/or arrangements of software entities are present. For example, in some embodiments, a runtime linker that performs operations associated with resolving dynamic dependencies is present among the software entities. As another example, in some embodiments, an operating system is present among the software entities. Generally, in the described embodiments, any arrangement of software entities can be used in which a shared library can configure itself to use a compatible version of a runtime component for subsequent execution as described herein.

Runtime components 304-306 are two different versions of a runtime component. As described above, each version of the runtime component, and thus each of runtime components 304-306, is a copy of the runtime component that was generated using a different arrangement of program code, object files, data values, etc. Shared library 302, which has a dependency on the runtime component, can be compatible with, and thus can use, either of runtime components 304-306. This might happen when runtime component 304 is an older version, runtime component 306 is a newer or current version, and shared library 302 is backward compatible with runtime component 304 and compatible with runtime component 306.

Each of the boxes for application 300, shared library 302, and runtime components 304-306 in FIG. 3 visually represents program code for that software entity, e.g., program code for that software entity that might be stored in a file system on a storage device (e.g., storage device 206) and executable by a processor (e.g., processor 202). Only a simplified pseudocode portion of the program code for each of the software entities is shown in FIG. 3. Applications 300, shared libraries 302, and/or runtime components 304-306 often include extensive and complex program code, but such program code is not shown in FIG. 3—other than generally and via ellipses—for clarity and brevity.

As can be seen in FIG. 3, the program code in each of application 300, shared library 302, and runtime components 304-306 includes "code lines," which are generic examples of lines of program code such as individual lines of program code, function calls, program code loops, variable declarations, etc. Among the program code for application 300 is SL function call, which is a generic example of a call, invocation, or other assertion of the SL function in the program code of shared library 302. Because application 300 includes the SL function call, application 300 has a dependency on shared library 302 (i.e., relies on program code that is found in shared library 302). Among the program code for shared library 302 is RC function call, which is a generic example of a call, invocation, or other assertion of the RC function in the program code of a runtime component. Because shared library 302 includes the RC function call, shared library 302 has a dependency on the runtime component. Note that application 300 and/or shared library 302 may include other function calls, variables, etc. that are not shown in FIG. 3, but that also form part of the dependency.

The program code of each of application 300, shared library 302, and runtime components 304-306 includes a file information section—i.e., file information section in application 300, SL file information section in shared library 302, and RC file information sections in runtime components 304-306. Each file information section includes information that is used by a processor for configuring, handling, executing, etc. the respective software entity. The file information sections are arranged in accordance with one or more specified formats or specifications. For example, in some embodiments, the file information sections are arranged in accordance with the well-known executable and linkable (ELF) file format. For the ELF file format, a specified portion of the file (e.g., bytes starting from a first byte of the file) is reserved for an ELF header in which specified sections include information for configuring, handling, executing, etc. the respective software entity. The ELF file format includes, among the information, a section with information that is used for resolving dependencies for the software entity. For example, the files may include a dynamic and/or relocation section that includes identifiers of expected paths to dependencies. In some embodiments, the identifiers of the paths are canonical paths to dependencies or include information, e.g., relative paths, that can be used to determine canonical paths to dependencies.

The program code of shared library 302 includes a constructor. The constructor is program code that is executed by a runtime linker as shared library 302 is loaded from a storage device into memory (e.g., memory 204) in preparation for the execution of application 300. Recall that, when application 300 is executed, the runtime linker program is run to initialize application 300 (e.g., by an operating system or other software entity of the electronic device). Among the operations that the runtime linker performs for initializing the application is resolving application 300's dependencies—i.e., for binding dependencies to application 300 and other software entities as needed to enable execution. The runtime linker also executes constructors, if any, in application 300 and the other software entities to perform operations associated with the initialization of application 300 and the other software entities. In the described embodiments, shared library 302's constructor includes program code that performs operations for finding a compatible version of the runtime library in a directory of a file system of the storage device and configuring the file information section of shared library 302 to identify that directory as being where the compatible version of the runtime component is located. In this way, the constructor—and thus shared library 302 itself—configures shared library 302 to use the compatible version of the runtime component. As described in more detail below, in some embodiments, the constructor in shared library 302 uses shared library path information acquired from the file information section of application 300, which includes information about application 300's context, to assist with finding the compatible version of the runtime component.

Process for Loading a Shared Library

Figure 4:
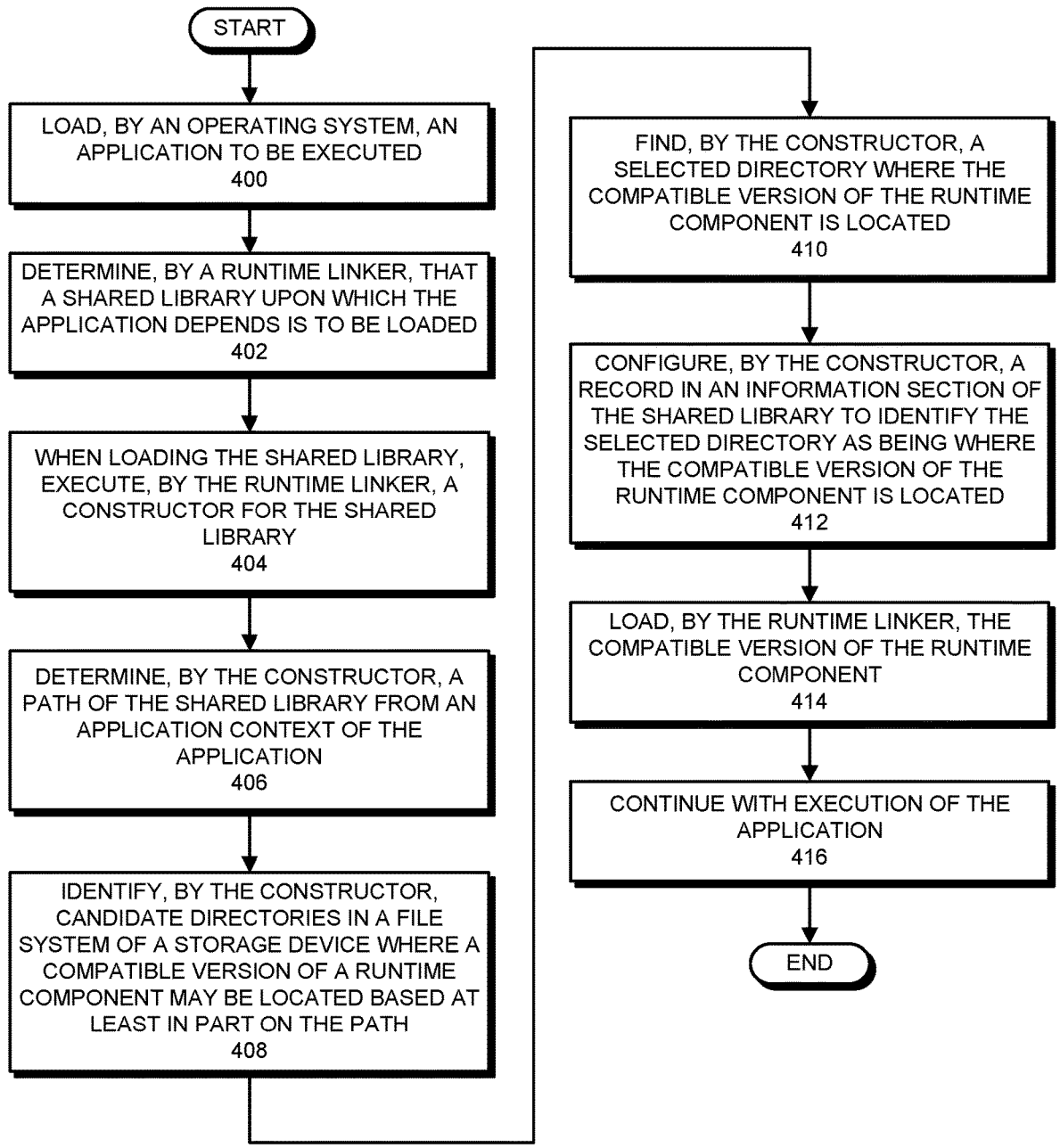
FIG. 4 presents a flowchart illustrating a process for a shared library configuring itself to use a compatible version of the runtime component in accordance with some embodiments.

In the described embodiments, a constructor in a shared library (e.g., shared library 118 or 302) finds a compatible version of a runtime component (e.g., one of runtime components 124 and 130 or 304-306) in a file system (e.g., file system 100) of a storage device (e.g., storage device 206) and configures the shared library to use the compatible version of the runtime component during subsequent execution. FIG. 4 presents a flowchart illustrating a process for a shared library configuring itself to use a compatible version of the runtime component in accordance with some embodiments. Note that the operations shown in FIG. 4 are presented as a general example of operations performed by some embodiments. The operations performed by other embodiments include different operations, operations that are performed in a different order, and/or operations that are performed by different entities or functional blocks.

The operations in FIG. 4 start when an operating system loads an application (e.g., application 110 or 300) (step 400). For this operation, the application is selected for execution and is thus invoked, called, or otherwise activated, e.g., by a user via an application icon or command line command, by another application or routine, etc. In response, the operating system (which is executed by a processor) commences loading the application from the storage device to memory. Note that the application (and other software entities as described below) are "loaded," or copied, from the storage device to the memory to enable more efficient access to program code of the application during subsequent execution. For example, in some embodiments, only a portion (e.g., a number of 4 kB pages of memory) of the program code of the application (and the other software entities) sufficient to initially set up and execute the application is loaded/copied, with the remainder of the program code of the application being loaded/copied as needed. As another example, in some embodiments, all of the program code of the application (and the other software entities) is loaded/copied from the storage device to memory.

The operating system invokes, as part of an operation for loading the application, a runtime linker that resolves dependencies for the application. The runtime linker determines that a shared library upon which the application depends is to be loaded (step 402). For this operation, the runtime linker reads a file information section of program code for the application, which includes information about the application's context, and determines that the shared library is to be loaded. The runtime linker also determines, from the file information section, a path (e.g., a canonical path) of the shared library. For example, in embodiments where the application is organized in accordance with an ELF file format, the runtime linker can read a dynamic and/or a relocation section to make the above-described determinations. The runtime linker next loads the shared library from the storage device to the memory.

The runtime linker, as part of the process for loading the shared library, executes (or, rather, causes the processor to execute) a constructor for the shared library (step 404). Recall that the shared library includes program code for a constructor which can perform various initialization functions for the shared library. Among the operations performed by the constructor are searching for a compatible version of a runtime component to be used by the shared library and configuring the shared library to use the compatible version of the runtime component during subsequent execution. When searching for the compatible version of the runtime component, the constructor first determines a path of the shared library from an application context of the application (step 406). For this operation, in some embodiments, the constructor reads information about the path of the shared library from information about the application's context in a file information section of the application. For example, in embodiments where the application is organized in accordance with an ELF file format, the constructor can read a dynamic section and/or a relocation section to determine the path to the shared library.

The constructor then identifies candidate directories in a file system of the storage device where a compatible version of the runtime component may be located based at least in part on the path (step 408). For this operation, the constructor uses the path of the shared library and possibly other path information to determine the candidate directories. In some embodiments, the constructor first derives or generates one or more paths (e.g., canonical paths) where the candidate directories are to be found. For example, the constructor may retrieve a listing or identification of one or more relative paths from a record in the shared library, such as an indication that some or all directories lower in the hierarchy than a directory indicated by the path of the shared library are to be considered candidate directories, etc. The "relative" paths are partial paths that are to be used in combination with the path to the shared library in order to form or generate the paths to the candidate directories. For example, if the path of the shared library is, using Unix-type nomenclature, /mno/abc, and the relative paths are /wxy and /hij, the constructor may derive paths /mno/abc/wxy and /mno/abc/hij. The constructor next identifies the one or more directories to be included among the candidate directories using the one or more paths. Continuing the example, the constructor would identify the directories at /mno/abc/wxy and /mno/abc/hij as candidate directories.

The constructor then finds a selected directory where the compatible version of the runtime component is located (step 410). Generally, for this operation, the constructor first searches some or all of the files in some or all of the candidate directories to find a version of the runtime component that best meets one or more version criteria. The constructor then chooses, as the selected directory, the candidate directory in which is stored a version of the runtime component that best meets the one or more version criteria.

For the searching in step 410, the constructor first determines or acquires the one or more version criteria. In some embodiments, the constructor derives (e.g., computes, generates, etc.) the version criteria from information such as the path to the shared library, a version identifier in the application context of the application and/or the shared library, etc. For example, the version criteria may be a filename criterion and the constructor may derive (or otherwise acquire) a best-matching filename as the version criterion. In this case, the runtime components include information about a version of the runtime component in their filename, such as is used for the Unix-type soname file naming convention, and the constructor determines the version criterion accordingly. As another example, the version criteria may be a file information criterion and the constructor may derive (or otherwise acquire) best-matching file information as the version criterion. In this case, the runtime components include information about a version of the runtime component in their file information section (e.g., in a file header, etc.) or in file metadata (e.g., in file system metadata associated with the version of the runtime component), and the constructor determines the version criterion based thereon.

After determining or acquiring the one of more version criteria, the constructor searches the candidate directories for the compatible version of the runtime component by comparing versions of the runtime component found in some or all of the candidate directories to the one or more version criteria to find the version of the runtime component that best meets the one or more version criteria. Continuing the above example of the filename version criterion, this operation includes comparing the filenames of some or all of the files in the next candidate directory to the filename version criterion to find a best match.

Note that the constructor searches for a "best match" for the one or more version criteria from among the files in the candidate directories. It may be the case that an ideally matching version, e.g., a current version of the runtime component that ideally or perfectly matches the one or more version criteria, is not found in the candidate directories, but an earlier, but still compatible, version of the runtime component is found. For example, version 3.3 of a runtime component may be an ideally matching version of the runtime component, but version 3.2 may be the most recent version of the runtime component available in the candidate directories. In some embodiments, therefore, the constructor generates a record of matching versions of the runtime component that includes less-than-ideal matches and can select from among the less-than-ideal matches for the best matching version of the runtime component when an ideally matching version of the runtime component is not found in the candidate directories.

In some embodiments, the constructor halts the searching early when an ideally matching version of the runtime component is found during the searching—and may therefore not search all of the files in the candidate directories and/or all the candidate directories. For example, if version 4.2 of the runtime component is determined by the constructor to be the ideally matching version of the runtime component and is found in one of the candidate directories, the constructor can halt the searching.

In some embodiments, when a compatible version of the runtime component is not found in the candidate directories, the constructor performs another, or "secondary," search to find a compatible version of the runtime component. For example, the compatible version of the runtime component may be stored in a newly-added directory by an end-user of the application—e.g., in a directory added to the file system by an end-user. In this case, the above-described search by the constructor in the candidate directories does not encounter a candidate directory in which a compatible version of the runtime component is stored because the compatible version of the runtime component is stored in an unexpected/unknown directory. Because failing to find a compatible version of the runtime component can mean halting execution of the application, the constructor performs the secondary search as a fallback operation. In some of these embodiments, the secondary search involves searching each of one or more specified other directories to determine other directories that include one or more versions of the runtime component. For example, the constructor may simply search all available and previously unsearched directories in the file system or may search directories in a specified portion or subsection of the file system, such as a portion of the file system generally or specifically identified in one or more records in the shared library or elsewhere. The searching includes comparing versions of the runtime component found in each other directory to the one or more version criteria and selecting, as the selected directory, an other directory in which a version of the runtime component best meets the version criterion. As described above, when the secondary search fails to find a compatible version of the runtime component, the processor can halt execution of the application or perform other error handling operations. Note that, in some embodiments, the secondary search is not performed when a compatible version of the runtime component is found in a candidate directory and is only a fallback for when a compatible version is not found.

Upon finding a directory having the version of the runtime component that best meets the one or more version criteria, either during the search of the candidate directories or during the secondary search, the constructor chooses that that directory as the selected directory. During this operation, the constructor configures a record in an internal state of the shared library to identify the selected directory as being where the compatible version of the runtime component is located (step 412). For example, the constructor can update information in an information section in program code of the shared library to identify a path (e.g., a canonical path) of the selected directory and thus of the compatible version of the runtime component. After the constructor performs this operation, the internal record of the shared library includes current and correct information about the location of the compatible version runtime component. The runtime linker uses the internal record of the shared library to load the compatible version of the runtime component (step 414) and the operating system continues execution of the application (step 416).

In some embodiments, at least one electronic device (e.g., electronic device 200) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 200 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device that executes an application that has a dependency on a shared library, the shared library having a dependency on a runtime component, the electronic device comprising:

a storage device with a file system that includes a plurality of directories; and a processor configured to execute the application, the executing including:

loading the shared library, the loading including:

executing a constructor for the shared library, the constructor causing the processor to identify a selected directory where a compatible version of the runtime component is to be found based on a location of the shared library in the file system, wherein the location of the shared library is determined from an application context from the application, and wherein the identifying includes:

determining a path of the shared library in the file system from the application context of the application;

identifying candidate directories in the file system where a compatible version of the runtime component may be located based at least in part on the path;

finding, using the candidate directories, the selected directory where the compatible version of the runtime component is located; and configuring a record in an internal state of the shared library to identify the selected directory as being where the compatible version of the runtime component is located; and when subsequently loading the compatible version of the runtime component for execution, locate the compatible version of the runtime component in the selected directory.

2. The electronic device of claim 1, wherein, when locating the compatible version of the runtime component in the selected directory, the processor is configured to:
use the record in the internal state of the shared library to locate the compatible version of the runtime component.

3. The electronic device of claim 1, wherein, when identifying the candidate directories in the file system where a compatible version of the runtime component may be located, the processor is configured to:
derive one or more given paths in the file system; and
identify one or more directories to be included among the candidate directories using the one or more given paths.

4. The electronic device of claim 3, wherein, when deriving the one or more given paths in the file system, the processor is configured to:
retrieve a listing or identification of one or more relative paths from a record in the shared library; and
derive the one or more given paths based on combinations of the path of the shared library and the one or more relative paths.

5. The electronic device of claim 4, wherein some or all of the path of the shared library and the given paths are canonical paths.

6. The electronic device of claim 1, wherein, when finding the selected directory where the compatible version of the runtime component is located, the processor is further configured to:
search each of the candidate directories to determine candidate directories that include one or more versions of the runtime component, the searching including comparing versions of the runtime component found in that candidate directory to the one or more version criteria; and
select, as the selected directory, a candidate directory in which a version of the runtime component best meets the one or more version criteria.

7. The electronic device of claim 6, wherein, when finding the selected directory where the compatible version of the runtime component is located, the processor is further configured to:
when none of the candidate directories include a version of the runtime component or the candidate directories include only versions of the runtime component that do not meet the one or more version criteria, perform a secondary search, the secondary search including:
searching each of one or more specified other directories to determine other directories that include one or more versions of the runtime component, the searching including comparing versions of the runtime component found in that other directory to the one or more version criteria; and
selecting, as the selected directory, an other directory in which a version of the runtime component best meets the one or more version criteria.

8. The electronic device of claim 7, wherein, when none of the candidate directories or the other directories include a version of the runtime component or the candidate directories and the other directories include only versions of the runtime component that do not meet the one or more version criteria, the processor is further configured to halt execution of the application.

9. The electronic device of claim 7, wherein the version criterion is that a version number associated with the runtime component has a given relationship with a specified version number.

10. The electronic device of claim 1, wherein, when determining the path of the shared library in the file system from the application context of the application, the processor is further configured to:
acquire the path of the shared library from a specified location in program code for the application.

11. The electronic device of claim 1, wherein the processor is further configured to:
acquire program code of the constructor or a reference thereto from program code for the shared library; and
execute the constructor using the program code of the constructor or the reference thereto.

12. A method of executing, by an electronic device that includes a processor and a storage device with a file system including a plurality of directories, an application that has a dependency on a shared library, the shared library having a dependency on a runtime component, the method comprising:
loading, by the processor, the shared library, the loading including executing a constructor for the shared library that causes the processor to:
identify a selected directory where a compatible version of the runtime component is to be found based on a location of the shared library in the file system, wherein the location of the shared library is determined from an application context from the application, and wherein the identifying includes:
determining a path of the shared library in the file system from the application context of the application;
identifying candidate directories in the file system where a compatible version of the runtime component may be located based at least in part on the path;
finding, using the candidate directories, the selected directory where the compatible version of the runtime component is located; and
configuring a record in an internal state of the shared library to identify the selected directory as being where the compatible version of the runtime component is located; and
when subsequently loading the compatible version of the runtime component for execution, locate the compatible version of the runtime component in the selected directory.

13. The method of claim 12, wherein locating the compatible version of the runtime component in the selected directory comprises:
using the record in the internal state of the shared library to locate the compatible version of the runtime component.

14. The method of claim 12, wherein identifying the candidate directories in the file system where a compatible version of the runtime component may be located includes:
deriving, by the processor, one or more given paths in the file system; and
identifying, by the processor, one or more directories to be included among the candidate directories using the one or more given paths.

15. The method of claim 14, wherein deriving the one or more given paths in the file system includes:

retrieving, by the processor, a listing or identification of one or more relative paths from a record in the shared library; and deriving, by the processor, the one or more given paths based on combinations of the path of the shared library and the one or more relative paths.

16. The method of claim 15, wherein some or all of the path of the shared library and the given paths are canonical paths.

17. The method of claim 12, wherein finding the selected directory where the compatible version of the runtime component is located comprises:

searching each of the candidate directories to determine candidate directories that include one or more versions of the runtime component, the searching including comparing versions of the runtime component found in that candidate directory to the one or more version criteria; and selecting, as the selected directory, a candidate directory in which a version of the runtime component best meets the one or more version criteria.

18. The method of claim 17, wherein finding the selected directory where the compatible version of the runtime component is located further comprises:

when none of the candidate directories include a version of the runtime component or the candidate directories include only versions of the runtime component that do not meet the one or more version criteria, perform, by the processor, a secondary search, the secondary search including:

searching, by the processor, each of one or more specified other directories to determine other directories that include one or more versions of the runtime component, the searching including comparing versions of the runtime component found in that other directory to the one or more version criteria; and selecting, by the processor, as the selected directory, an other directory in which a version of the runtime component best meets the one or more version criteria.

19. The method of claim 18, wherein the method further comprises:

when none of the candidate directories or the other directories include a version of the runtime component or the candidate directories and the other directories include only versions of the runtime component that do not meet the one or more version criteria, halting, by the processor, execution of the application.

20. The method of claim 18, wherein the one or more version criteria include a version criterion that a version number associated with the runtime component has a given relationship with a specified version number.

21. The method of claim 13, wherein determining the path of the shared library in the file system from the application context of the application comprises:

acquiring, by the processor, the path of the shared library from a specified location in program code for the application.

22. The method of claim 12, wherein the method further comprises:

acquiring, by the processor, program code of the constructor or a reference thereto from program code for the shared library; and executing, by the processor, the constructor using the program code of the constructor or the reference thereto.

\* \* \* \* \*